US009266107B2

(12) United States Patent
Beer

(10) Patent No.: US 9,266,107 B2
(45) Date of Patent: *Feb. 23, 2016

(54) MONODISPERSE MICRODROPLET GENERATION AND STOPPING WITHOUT COALESCENCE

(71) Applicant: LAWRENCE LIVERMORE NATIONAL SECURITY, LLC., Livermore, CA (US)

(72) Inventor: Neil Reginald Beer, Pleasanton, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 14/662,535

(22) Filed: Mar. 19, 2015

(65) Prior Publication Data

US 2015/0238965 A1 Aug. 27, 2015

Related U.S. Application Data

(62) Division of application No. 12/364,972, filed on Feb. 3, 2009, now Pat. No. 9,011,777.

(60) Provisional application No. 61/038,543, filed on Mar. 21, 2008.

(51) Int. Cl.
*G01N 21/00* (2006.01)
*B01L 3/00* (2006.01)
(Continued)

(52) U.S. Cl.
CPC ......... *B01L 3/502761* (2013.01); *B01F 3/0807* (2013.01); *B01F 5/0471* (2013.01); *B01F 13/0059* (2013.01); *B01F 13/0062* (2013.01); *B01L 3/50273* (2013.01);
(Continued)

(58) Field of Classification Search
CPC .................. B01L 3/502792; B01L 2300/0861; G05D 7/0694
USPC ...................................................... 422/82, 93
See application file for complete search history.

(56) References Cited

U.S. PATENT DOCUMENTS

| | | | | |
|---|---|---|---|---|
| 2005/0221339 | A1 * | 10/2005 | Griffiths | G01F 5/0646 435/6.11 |
| 2007/0039866 | A1 * | 2/2007 | Schroeder et al. | 210/265 |
| 2008/0166793 | A1 | 7/2008 | Beer et al. | |

OTHER PUBLICATIONS

Beer et al., "Monodisperse Pico-Liter Droplet Generation and Rapid Trapping for Single Molecule Detection and Reaction Kinetics Measurement," The Royal Society of Chemistry, 2009, pp. 1-7.

*Primary Examiner* — Natalia Levkovich
(74) *Attorney, Agent, or Firm* — Eddie E. Scott

(57) ABSTRACT

A system for monodispersed microdroplet generation and trapping including providing a flow channel in a microchip; producing microdroplets in the flow channel, the microdroplets movable in the flow channel; providing carrier fluid in the flow channel using a pump or pressure source; controlling movement of the microdroplets in the flow channel and trapping the microdroplets in a desired location in the flow channel. The system includes a microchip; a flow channel in the microchip; a droplet maker that generates microdroplets, the droplet maker connected to the flow channel; a carrier fluid in the flow channel, the carrier fluid introduced to the flow channel by a source of carrier fluid, the source of carrier fluid including a pump or pressure source; a valve connected to the carrier fluid that controls flow of the carrier fluid and enables trapping of the microdroplets.

3 Claims, 11 Drawing Sheets

(51) Int. Cl.

| | |
|---|---|
| ***B01F 3/08*** | (2006.01) |
| ***B01F 5/04*** | (2006.01) |
| ***B01F 13/00*** | (2006.01) |
| ***G05D 7/06*** | (2006.01) |
| *B01L 3/02* | (2006.01) |
| *B01L 7/00* | (2006.01) |

(52) U.S. Cl.
CPC .... *B01L 3/502738* (2013.01); *B01L 3/502784* (2013.01); *G05D 7/0694* (2013.01); *B01L 3/0241* (2013.01); *B01L 7/52* (2013.01); *B01L 2200/0605* (2013.01); *B01L 2200/0668* (2013.01); *B01L 2300/0838* (2013.01); *B01L 2300/0864* (2013.01); *B01L 2300/0867* (2013.01); *B01L 2400/04* (2013.01); *B01L 2400/043* (2013.01); *B01L 2400/0487* (2013.01); *B01L 2400/06* (2013.01); *Y10T 137/0329* (2015.04); *Y10T 137/218* (2015.04); *Y10T 137/2191* (2015.04); *Y10T 137/2218* (2015.04); *Y10T 137/2224* (2015.04)

MONODISPERSE MICRODROPLET GENERATION AND STOPPING WITHOUT COALESCENCE

CROSS-REFERENCE TO RELATED APPLICATIONS

The present application is a Division of application Ser. No. 12/364,972 filed Feb. 3, 2009, which claims benefit under 35 U.S.C. §119(e) of U.S. Provisional Patent Application No. 61/038,543 filed on Mar. 21, 2008 entitled "method for monodisperse microdroplet generation and stopping without coalescence for interrogation, chemical reaction, or sorting," the disclosure of which is hereby incorporated by reference in its entirety for all purposes.

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

1. Field of Endeavor

The present invention relates to microfluidic devices and more particularly to microfluidic devices for generating and trapping monodisperse microdroplets in a microfluidic channel.

2. State of Technology

Microfluidic devices are poised to revolutionize environmental, chemical, biological, medical, and pharmaceutical detectors and diagnostics. "Microfluidic devices" loosely describes the new generation of instruments that mix, react, count, fractionate, detect, and characterize complex gaseous or liquid-solvated samples in a micro-optical-electro-mechanical system (MOEMS) circuit manufactured through standard semiconductor lithography techniques. These techniques allow mass production at low cost as compared to previous benchtop hardware. The applications for MOEMS devices are numerous, and as diverse as they are complex.

As sample volumes decrease, reagent costs plummet, reactions proceed faster and more efficiently, and device customization is more easily realized. By reducing the reaction volume, detection of target molecules occurs faster through improved sensor signal to noise ratio over large, cumbersome systems. However, current MOEMS fluidic systems may only be scratching the surface of their true performance limits as new techniques allow for repeatable generation and manipulation of nano-scale and pico-scale microfluidic reactors, loosely termed "microdroplets." Some popular monodisperse (same size) microdroplet generating techniques include flow focusing and the T-junction, both of which employ the water-in-oil emulsion method for generating discrete aqueous chemical and/or biological reactors, at volumes previously unheard of. For example, droplets tens of microns in diameter contain a volume in the tens of picoliters. These tiny volumes, when properly controlled, enable revolutionary science, such as: single cell isolation and analysis, single molecule detection, nucleic acid amplification from single genome copies, in-vitro protein translation, microdroplet protein crystallization, and other novel techniques. The ability to generate monodisperse droplets has been crucial for optical calibration and droplet manipulation since a polydisperse distribution of droplets changes the optical interrogation performance, as well as altering the chemical kinetics of reactions within the droplets due to differing analyte quantities.

To date, the limitation of monodisperse microdroplet generation has been that it is a steady-state phenomenon, generating typically hundreds to thousands of microdroplets per second. This causes a problem when the stream of droplets needs to be slowed down or stopped for subsequent on-chip manipulation, energy deposition, chemical reaction, or optical interrogation and analysis. Prior art has been limited to employing droplets only in analyses that can happen at very short timescales, which excludes many interesting problems that would benefit from the perfect isolation the spherical aqueous microreactors can provide.

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a system that includes a microfluidic channel, a fluid in microfluidic channel, and micro droplets in the microfluidic channel, wherein an emulsion is formed of the micro droplets in the fluid. An emulsion is a mixture of two immiscible liquids. One liquid (the dispersed phase) is dispersed in the other (the continuous phase). A commonly used emulsion is an oil/water emulsion, where oil droplets are dispersed in an aqueous mixture. In other cases aqueous droplets are dispersed in an oil, which is a water/oil emulsion. Unless otherwise specified, we use the term "Emulsion Fluid" to designate the continuous phase, or "carrier" fluid, and we use the term "Emulsion Source" to designate the "Emulsion Fluid source."

The present invention provides apparatus and methods for on-chip microreactor generation and trapping for subsequent optical or electromagnetic interrogation, chemical reaction, microdroplet sorting, and/or archival. In one embodiment the present invention provides apparatus and methods for on-chip monodisperse microdroplet generation and trapping for subsequent microdroplet optical or electromagnetic interrogation, chemical reaction, microdroplet sorting, and/or archival. The present invention also describes a system for channel washing, if desired, between experiments. In one embodiment the present invention provides an apparatus for monodispersed microdroplet generation and trapping including a microchip; a flow channel in the microchip; a droplet maker that generates microdroplets, the droplet maker connected to the flow channel; a carrier fluid in the flow channel, the carrier fluid introduced to the flow channel by a source of carrier fluid, the source of carrier fluid including a pump or pressure source; a valve connected to the carrier fluid that controls flow of the carrier fluid and enables trapping of the microdroplets. In another embodiment the present invention provides a method of monodispersed microdroplet generation and trapping that includes the steps of providing a flow channel in a microchip; producing microdroplets in the flow channel, the microdroplets movable in the flow channel; providing carrier fluid in the flow channel using a pump or pressure source; controlling movement of the microdroplets in the flow channel and trapping the microdroplets in a desired location in the flow channel.

The present invention has uses in biowarfare detection applications for identifying, detecting, and monitoring biothreat agents that contain nucleic acid signatures, such as spores, bacteria, viruses etc. The present invention has uses in biomedical applications for tracking, identifying, and monitoring outbreaks of infectious disease including emerging, previously unidentified and genetically engineered pathogens; for automated processing, amplification, and detection of host or microbial and viral DNA or RNA in biological fluids for medical purposes; for automated processing and detection of proteomic signatures in biological fluids; for cell cytometry or viral cytometry in fluids drawn from clinical or veterinary patients for subsequent analysis; for high throughput genetic screening for drug discovery and novel therapeutics; for in-vitro protein translation; for on-chip cell isolation; and for genetic sequencing and SNP detection.

The present invention has uses in forensic applications for automated processing, amplification, and detection DNA in biological fluids for forensic purposes. The present invention has uses in food and beverage safety for automated food testing for bacterial or viral contamination. The present invention has uses in chemical analysis and synthesis for protein crystallography, emulsification, fluid partitioning, and nanoparticle synthesis. The present invention has uses in biochemical detection for contraband detection, explosives detection, nanoscale reactor generation, picoscale reactor generation.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
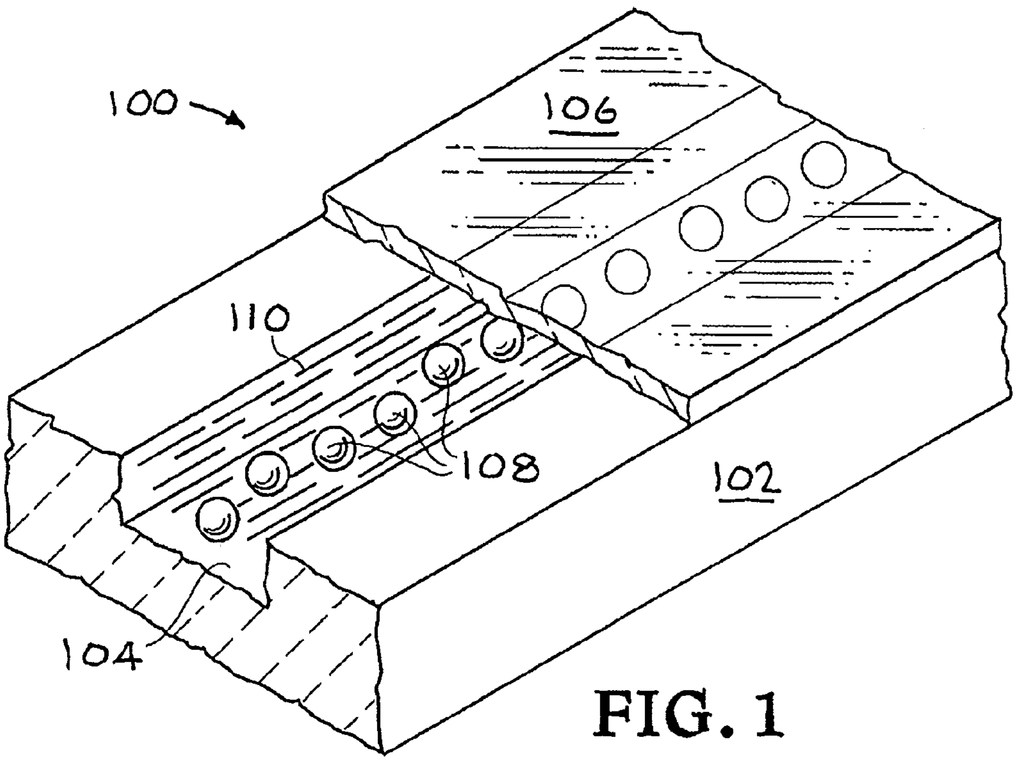
FIG. 1 is an illustration of monodispersed microdroplets generated and trapped on a chip.

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Referring now to the drawings and in particular to FIG. 1, an illustration of monodispersed microdroplets generated and trapped on a chip is illustrated. The system illustrated in FIG. 1 includes the following structural elements: microfluidic device 100, chip 102, microfluidic channel 104, cover plate 106, micro droplets 108 and a fluid 110 that creates an emulsion of the micro droplets 108 in the fluid 110. The system provides generation of a monodisperse stream of microdroplets and subsequent stopping the stream of microdroplets without droplet coalescence. The article "Monodisperse droplet generation and rapid trapping for single molecule detection and reaction kinetics measurement" by Neil Reginald Beer, Klint Aaron Rose and Ian M. Kennedy (Article citation: Neil Reginald Beer, *Lab Chip,* 2009, DOI: 10.1039/b818478j) provides additional information about generating a monodisperse stream of microdroplets and subsequently stopping the stream of microdroplets without droplet coalescence. The article "Monodisperse droplet generation and rapid trapping for single molecule detection and reaction kinetics measurement" by Neil Reginald Beer, Klint Aaron Rose and Ian M. Kennedy (Article citation: Neil Reginald Beer, *Lab Chip,* 2009, DOI: 10.1039/b818478j) is incorporated herein in its entirety by this reference.

The present invention provides apparatus and methods for generating a monodisperse stream of microdroplets and subsequently stopping the stream of microdroplets without droplet coalescence for as long as the droplets need to be stopped to allow chemical reaction, energy deposition, and optical interrogation to occur, such as in the on-chip Polymerase Chain Reaction process. The flow may then be restarted, seconds, minutes, hours, or days later to continue the experiment, sort or archive microdroplets, refresh the microfluidic channels, etc. The present invention enables much longer photon acquisition times for single molecule/low light detection, it allows for non-instantaneous chemical reactions (the majority), and it allows for sorting and archival at a pace that matches data acquisition and control system capability. The microdroplets in the micro-nano-pico or femtoliter range can be chemically reacted, heated, cooled, optically interrogated, sorted and analyzed for as long as desired before channel flow is restarted. This greatly expands the use of microdroplet chemical and optical analysis of microfluidics because reactions will no longer have to take place within the millisecond time frames that moving droplets are in view of a device's optical window.

Figure 2A:
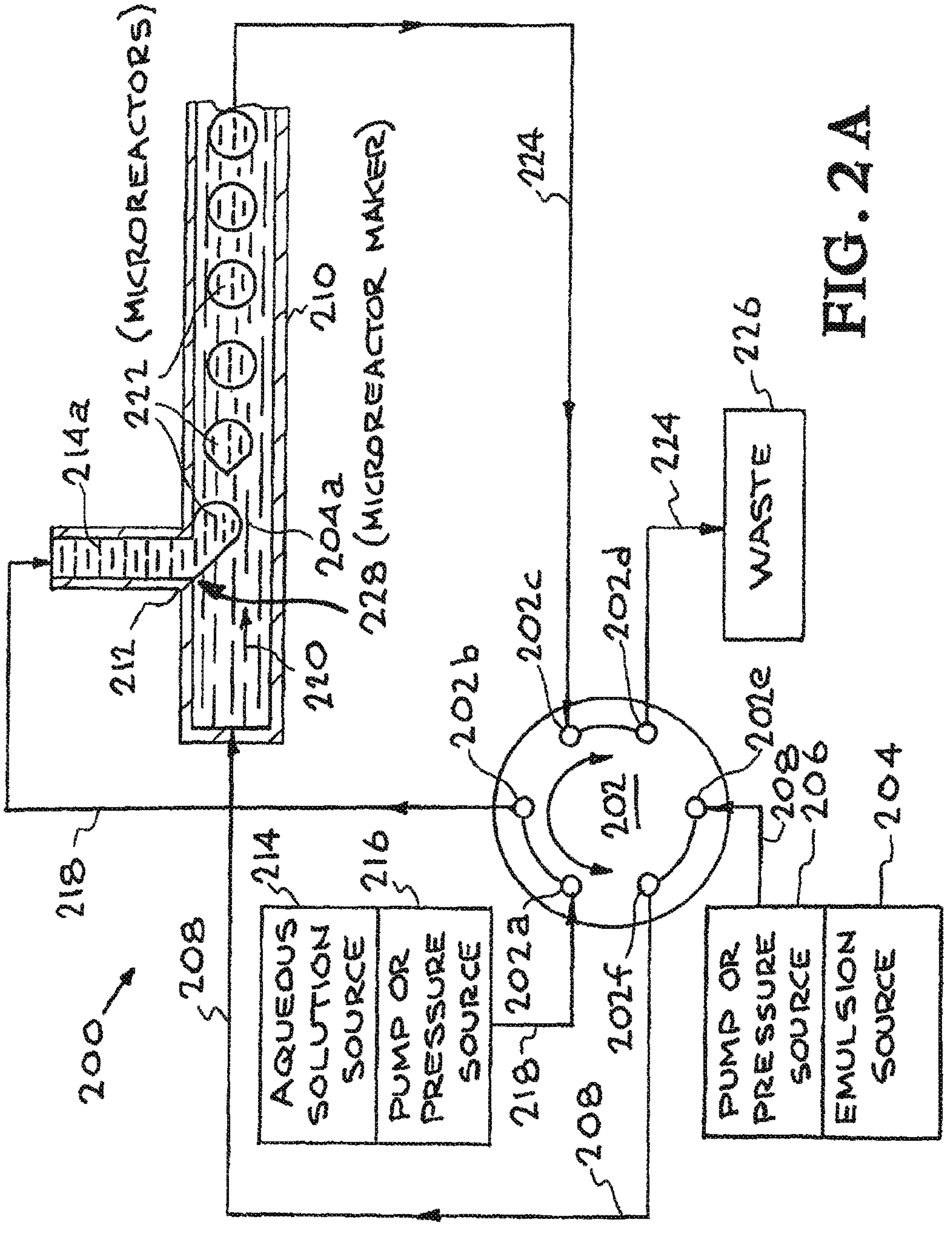
FIGS. 2A, 2B, and 2C illustrate three embodiments of systems for generating a monodisperse stream of microdroplets and subsequently stopping the stream of microdroplets without droplet coalescence.
Figure 2B:
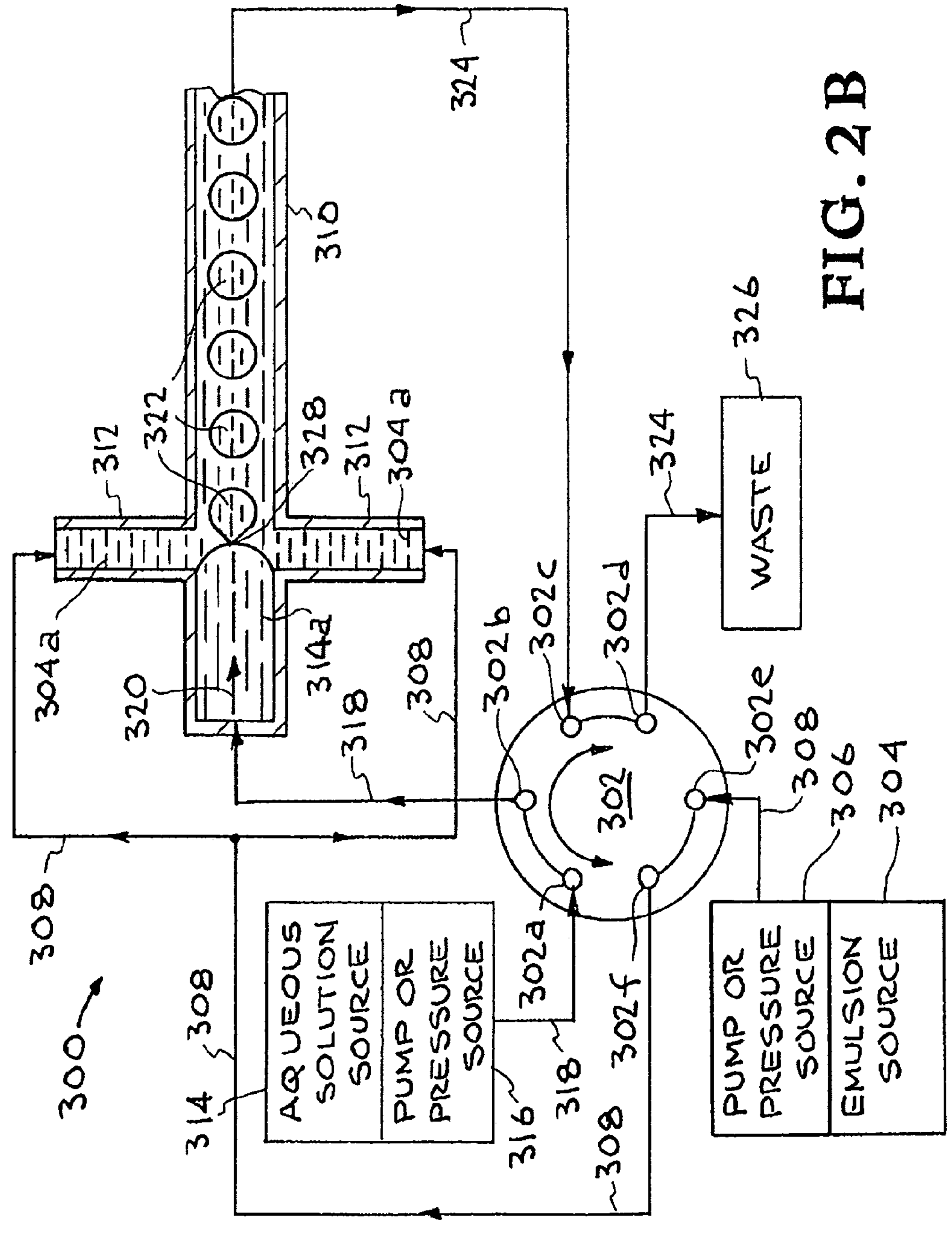
Figure 2C:
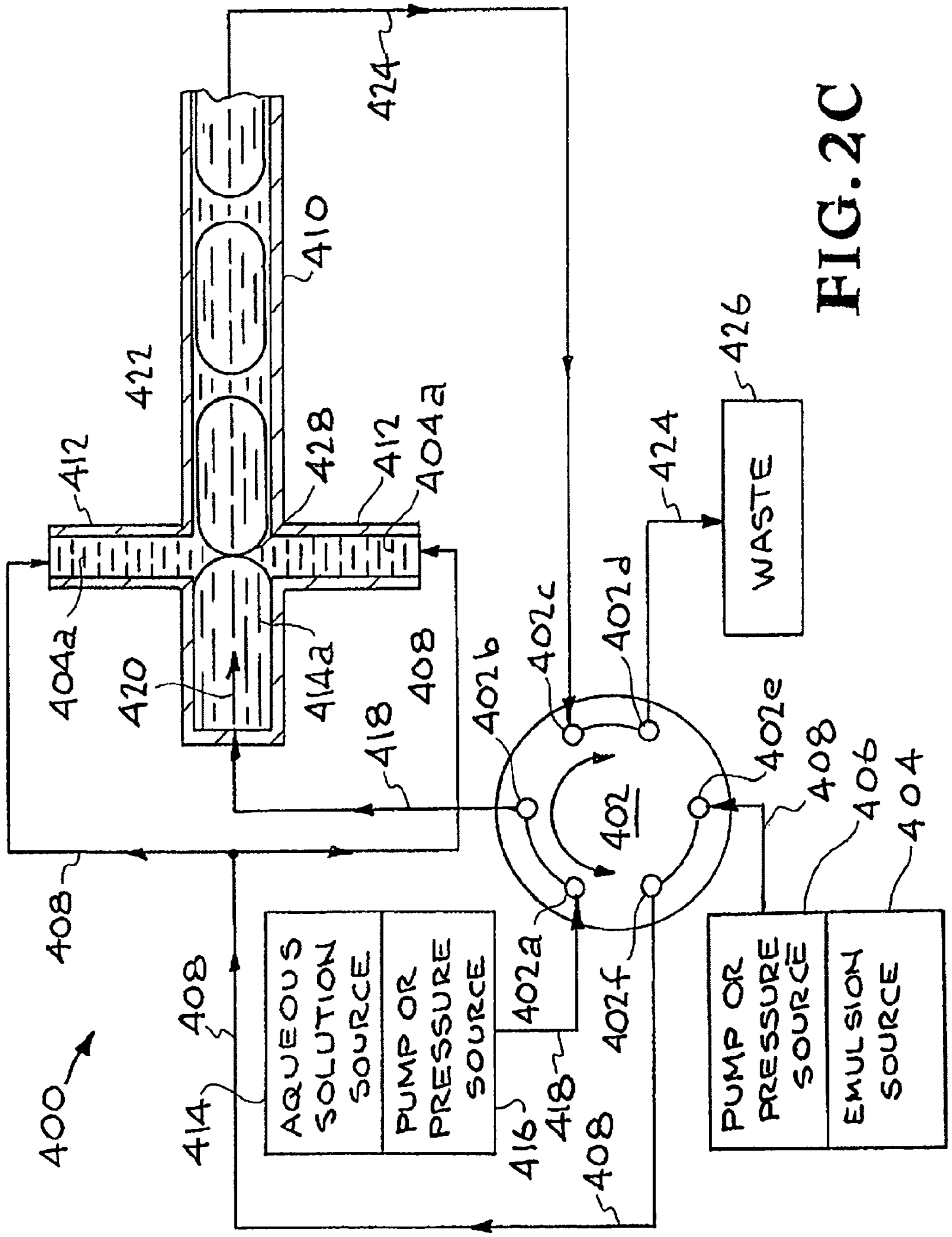
Figures 3A, 3B, 3C, 3D, 3E, 3F, 3G, 3H:
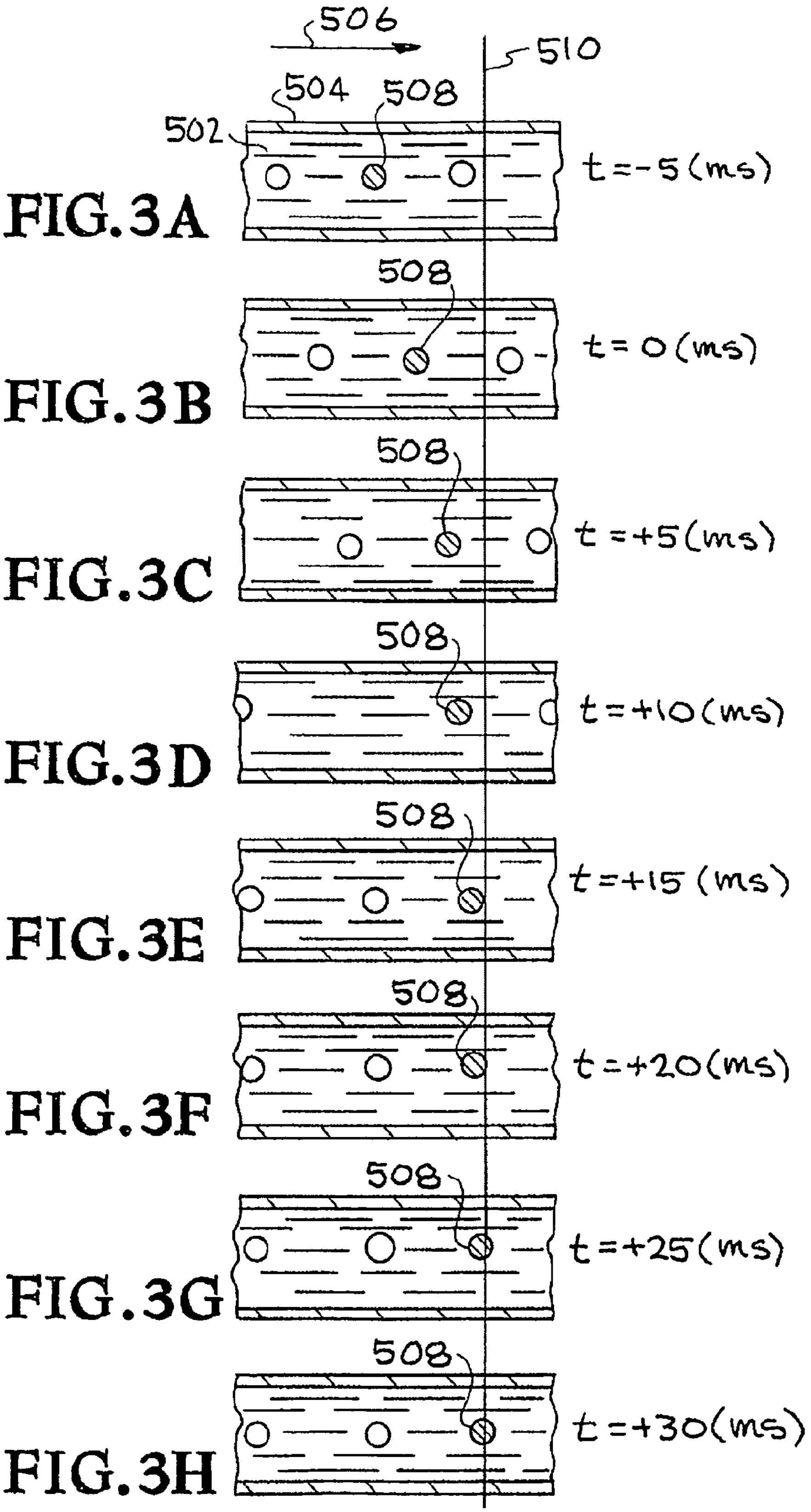
FIGS. 3A-3H illustrate the stopping action of a droplet in the flow channel.

Referring now to FIGS. 2A, 2B, and 2C, three embodiments of systems for generating a monodisperse stream of microdroplets and subsequently stopping the stream of microdroplets without droplet coalescence constructed in accordance with the present invention are illustrated. The three embodiments provide methods and apparatus for generating monodisperse microdroplets and trapping them indefinitely in the same microfluidic channel without droplet coalescence or addition of surfactants (which alter droplet chemistry). In some embodiments of the present invention surfactants are added. These microdroplets in the micro-nano-pico or femtoliter range can then be chemically reacted, heated, cooled, optically interrogated, sorted and analyzed for as long as desired before channel flow is restarted. This ability will greatly expand the use of microdroplet chemical and optical analysis of microfluidics because reactions will no longer have to take place within the millisecond time frames that moving droplets are in view of a device's optical window.

Furthermore, microfluidic device designs will change, eliminating complex serpentine channels (developed to lengthen path lengths to keep droplets on the chip and in-view longer), as they are no longer needed with the ability to stop droplets and interrogate them at-will in real time. This will free up valuable real estate on the chip surface, to be used for other important functions. Additionally, exciting new studies in single molecule detection, which require long optical exposure times to collect enough photons for detection above the background noise, can now be studied in stationary, monodisperse, aqueous microdroplets, whereas in the past they were either limited in photon collection times or performed on fixed substrates—a significant limitation to the chemistries involved.

Flow in microfluidic devices is governed by Stoke's flow. (Stoke's flow is a linearized solution of the Navier-Stokes equations and accounts for the insignificance of inertia affects to flow in micron-scale channels.)

$$\nabla p = \mu \nabla^2 \vec{V} \quad \text{[Equation 1]}$$

Which reduces to:

$$F = 6\pi\mu U_0 a \quad \text{[Equation 2]}$$

Where F is the force on the droplet, μ is the fluid media viscosity, $U_0$ is the mean flow rate, and a is the particle radius. For emulsions, this art can employ an upstream microdroplet generator, such as a T-junction or a flow focusing microdroplet generator to create microdroplet reactors (aqueous droplets in an oil carrier flow or oil droplets in an aqueous flow) that are partitioned from each other and the fluid medium by the oil/water interface. This provides a method to generate and trap monodisperse droplets on-chip. This is possible by the dynamics of the Stoke's flow equation. Note there is no inertia term in this flow regime, so once the supply pressure or flow rate is stopped (valved) the flow stops instantaneously. This effect, correctly applied, provides the capability to increase the signal to noise or improve the instrument's limit of detection (LOD) proportional to the amount of time droplets are interrogated before restarting the flow. This allows collection of light (or signal) to be limited only by photobleaching of the fluorophore or the dynamics of the reaction directly under observation. This presents an ideal case for the optical laboratory on a chip, the ability to interrogate at-will individually partitioned microreactors of constant size (monodisperse) for as long as desired before restarting the flow and resuming the experiment on a different field of microdroplets. This method will quickly find itself in instruments that perform PCR, binding assays, chemical detection, nanoparticle synthesis, crystallization, and any other systems where near real-time performance or highly sensitive limits of detection are beneficial. This performance enhancement may provide the transformational impetus needed to move many biomedical instruments from the laboratory to point-of-care locations, and hence multiply the number of instruments needed. Furthermore, this method works well with magnetic nanoparticles solvated in the aqueous solution, allowing microdroplet reactors with the bead substrate to be generated, stopped, and operated identically to simple aqueous microdroplets, without the need for magnetic trapping.

This method specifically entails a single fast valve actuation to simultaneously close all lines to and from the microfluidic device sharing channel connectivity. By employing a custom multiport valve configuration, but rotating the valve rotor between ports through multiposition stepper motor actuation, all lines to and from the device may be taken from open (droplet generation) to closed (droplet trapping) in milliseconds. Given the non-inertial character of Stoke's flow, this method has proven to trap monodisperse microdroplets on the device indefinitely. This method works on soft device substrates such as PolyDiMethylSiloxane (PDMS), and is even more effective on harder substrates due to the lack of pressure capacitance in the fluid path. A glass or silicon device substrate, such as those made from the common photolithography chip manufacturing process, is ideal, and can be coupled to the valve through PEEK, stainless steel, polycarbonate or other relatively inelastic lines.

Referring now to FIG. 2A a system for droplet stopping with a T-junction generator is illustrated. The system is designated generally by the reference numeral 200. The system 200 includes the following structural elements: multiport valve 202, ports 202*a*-202*f*, emulsion fluid source 204, emulsion fluid 204*a*, pump or pressure source 206, line 208 (emulsion fluid), microfluidic channel 210, T-junction 212, aqueous solution 214, pump or pressure source 216, line (Aqueous) 218, directional arrow 220, droplets 222, return line 224, and waste container 226. The sample to be analyzed or otherwise acted upon is usually contained in the aqueous solution 214*a*.

In operation an aqueous fluid with the desired chemical reagents that may or may not include magnetic nanoparticles is injected into the cross-channel flow of oil carrier fluid (T-junction shearing) as illustrated in FIG. 2A. Pump 206 delivers emulsion fluid 204*a* from the emulsion fluid source 204 through line 208 to port 202*e* on multiport valve 202. Emulsion fluid 204*a* exits valve 202 at port 202*f* and flows through line 208 and enters microfluidic channel 210.

Pump 216 delivers aqueous solution 214 through line 218 to valve 202 at port 202*a*. The aqueous solution 214 exits valve 202 at port 202*b* and flows thru line 218 to T-Junction 212. The emulsion fluid 204*a* flowing in microfluidic channel 210 in the direction shown by arrow 220 interacts with aqueous solution 214*a* at T-Junction 212 and by a shearing action droplets 222 are formed producing an emulsion of droplets 222 in fluid 204*a*. The aqueous solution droplets 222 formed of the aqueous solution 214*a* do not mix with fluid 204*a* and remain suspended as discrete droplets. By repositioning valve 202 all ports can be shut effectively stopping all motion in microfluidic channel 210. This essentially freezes droplets 222 in some pre-determined position in order to perform some task on the droplets 222. Upon completion of the process on the droplets 222 the valve 202 can be repositioned and the droplets 222 can flow along return line 222 and pass thru ports 202*c* & 202*d* on valve 202 and on to waste container 226.

The system 200 provides apparatus and methods for generating a monodisperse stream of microdroplets 222 and subsequently stopping the stream of microdroplets 222 without droplet coalescence for as long as the droplets need to be stopped to allow chemical reaction, energy deposition, and optical interrogation to occur, such as in the on-chip Polymerase Chain Reaction process. The flow may then be restarted, seconds, minutes, hours, or days later to continue the experiment, sort or archive microdroplets, refresh the microfluidic channels, etc. The system 200 enables much longer photon acquisition times for single molecule/low light detection, it allows for non-instantaneous chemical reactions (the majority), and it allows for sorting and archival at a pace that matches data acquisition and control system capability. The microdroplets in the micro-nano-pico or femtoliter range can be chemically reacted, heated, cooled, optically interrogated, sorted and analyzed for as long as desired before channel flow is restarted. This greatly expands the use of microdroplet chemical and optical analysis of microfluidics because reactions will no longer have to take place within the millisecond time frames that moving droplets are in view of a device's optical window.

Referring now to FIG. 2B a system for droplet stopping with flow focusing is illustrated. The system is designated generally by the reference numeral 300. The system 300 includes the following structural elements: multiport valve 302, ports 302*a*-302*f*, emulsion fluid source 304, emulsion fluid 304*a*, pump or pressure source 306, line 308 (emulsion fluid), microfluidic channel 310, flow focusing ports 312, aqueous solution 314, pump or pressure source 316, line (Aqueous) 318, directional arrow 320, droplets 322, return line 324, and waste container 326.

In operation an aqueous fluid with the desired chemical reagents that may or may not include magnetic nanoparticles is injected into the flow focusing area of cross-channel flow of oil carrier fluid as illustrated in FIG. 2B. Pump 306 delivers emulsion fluid 314*a* thru line 308 to port 302*e* on multiport valve 302. Emulsion fluid 314*a* exits valve 302 at port 302*f* and flows along line 308 and enters flow focusing ports 312. Pump 316 delivers aqueous solution 314 thru line 318 to port 302*a* on valve 302. The aqueous solution 314 exits valve 302 at port 302*b* and flows thru line 318 and enters microfluidic channel 310.

The aqueous solution 314*a* flowing in microfluidic channel 310 in the direction of arrow 320 meets the emulsion fluid 304*a* entering microfluidic channel 310 thru flow focusing ports 312. The emulsion fluid 304*a* and aqueous solution 314*a* do not want to mix so at the interface 328 of emulsion fluid & aqueous solution 314*a* a flow focusing action occurs and droplets 322 are formed and separate into discrete droplets 322 which are entrained and suspended as an emulsion of droplets 322 in aqueous solution 314*a*. By repositioning valve 302 all the ports can be shut effectively stopping all motion in the microfluidic channel 310. This essentially freezes droplets 322 at some predetermined position on the chip in order to perform some task on the droplets 322. Upon completion of the process on the droplets 322 the valve 302 can be repositioned and the droplets 322 can flow along return line 324 and pass thru ports 302*c* & 302*d* on valve 302 and on to waste container 326.

Referring now to FIG. 2C a system for droplet stopping with a shear action slug generator is illustrated. The system is designated generally by the reference numeral 400. The system 400 includes the following structural elements: multiport valve 402, ports 402*a*-402*f*, emulsion fluid source 404, emulsion fluid 404*a*, pump or pressure source 406, line 408, microfluidic channel 410, channels for shear action slug generation 412, aqueous solution 414, pump or pressure source 416, line (Aqueous) 418, directional arrow 420, slugs 422, return line 424, waste container 426, and interface aqueous solution and emulsion 428.

In operation an aqueous fluid with the desired chemical reagents that may or may not include magnetic nanoparticles is injected into the cross-channel flow of oil carrier fluid as illustrated in FIG. 2C. In operation an aqueous fluid with the desired chemical reagents that may or may not include magnetic nanoparticles is injected into the cross-channel flow of oil carrier fluid as illustrated in FIG. 2C. Pump 406 delivers emulsion fluid 404*a* from emulsion fluid source 404 through line 408 to port 402*e* on multiport valve 402. Emulsion fluid 404 exits valve 402 at port 402*f* and flows through line 408 and enters microfluidic channel 410 through the two flow focusing ports 412.

Pump 416 delivers aqueous solution 414*a* from the aqueous solution source 414 through line 418 to valve 402 at port 402*a*. The aqueous solution 414*a* exits valve 402 at port 402*b* and flows thru line 418 to the channels for shear action slug generation 412. The emulsion fluid 404*a* flowing in microfluidic channel 410 interacts with aqueous solution 414*a* at the channels for shear action slug generation (double T-Junction) 412 and by a shearing action slugs 422 are formed. The aqueous solution slugs 422 formed of the aqueous solution 414*a* do not mix with fluid 404*a* and are transported in the direction of arrow 420 as discrete slugs, i.e. as an emulsion of aqueous solution 414, in fluid 404*a*. By repositioning valve 402 all ports can be shut effectively stopping all motion in microfluidic channel 410. This essentially freezes slugs 422 in some pre-determined position in order to perform some task on the slugs 422. Upon completion of the process on the slugs 422 the valve 402 can be repositioned and the slugs 422 can flow along return line 422 and pass thru ports 402*c* & 402*d* on valve 402 and on to waste container 426.

The system 400 provides apparatus and methods for generating a monodisperse stream of microslugs 422 and subsequently stopping the stream of microslugs 422 without droplet coalescence for as long as the slugs need to be stopped to allow chemical reaction, energy deposition, and optical interrogation to occur, such as in the on-chip Polymerase Chain Reaction process. The flow may then be restarted, seconds, minutes, hours, or days later to continue the experiment, sort or archive microslugs, refresh the microfluidic channels, etc. The system 400 enables much longer photon acquisition times for single molecule/low light detection, it allows for non-instantaneous chemical reactions (the majority), and it allows for sorting and archival at a pace that matches data acquisition and control system capability. The microslugs can be chemically reacted, heated, cooled, optically interrogated, sorted and analyzed for as long as desired before channel flow is restarted. This greatly expands the use of microdroplet or micro slug chemical and optical analysis of microfluidics because reactions will no longer have to take place within the millisecond time frames that moving droplets are in view of a device's optical window.

Referring now to FIGS. 3A-3H, the stopping action of a droplet in the flow channel is illustrated. The illustrations of FIGS. 3A-3H represent droplet stopping action images taken by a camera. The droplet stopping in action images were taken at 0.5 ms intervals by a MotionPro HS-4 CMOS camera with a 10× objective during droplet stopping. Every tenth image is shown in FIGS. 3A-3H. Images after 30 ms were identical and omitted for clarity. Droplets suspended in emulsion 502 are moving thru microfludic channel 504 in the direction shown by arrow 506. The droplet of interest 508 is shown cross hatched for clarity. The line 510 defines the droplets stopped position. Time $t_0$ is approximate. Note the same droplet is tracked through the frames to show the deceleration. Flow in the channel is from left to right. Initial oil emulsifier flow rate is 10 μL/min, aqueous flow rate is 0.3 μL/min. Channel cross section is elliptical, 150 μm wide by 60 pm deep. Computed droplet stopping time is ~38 ms.

Figure 4:
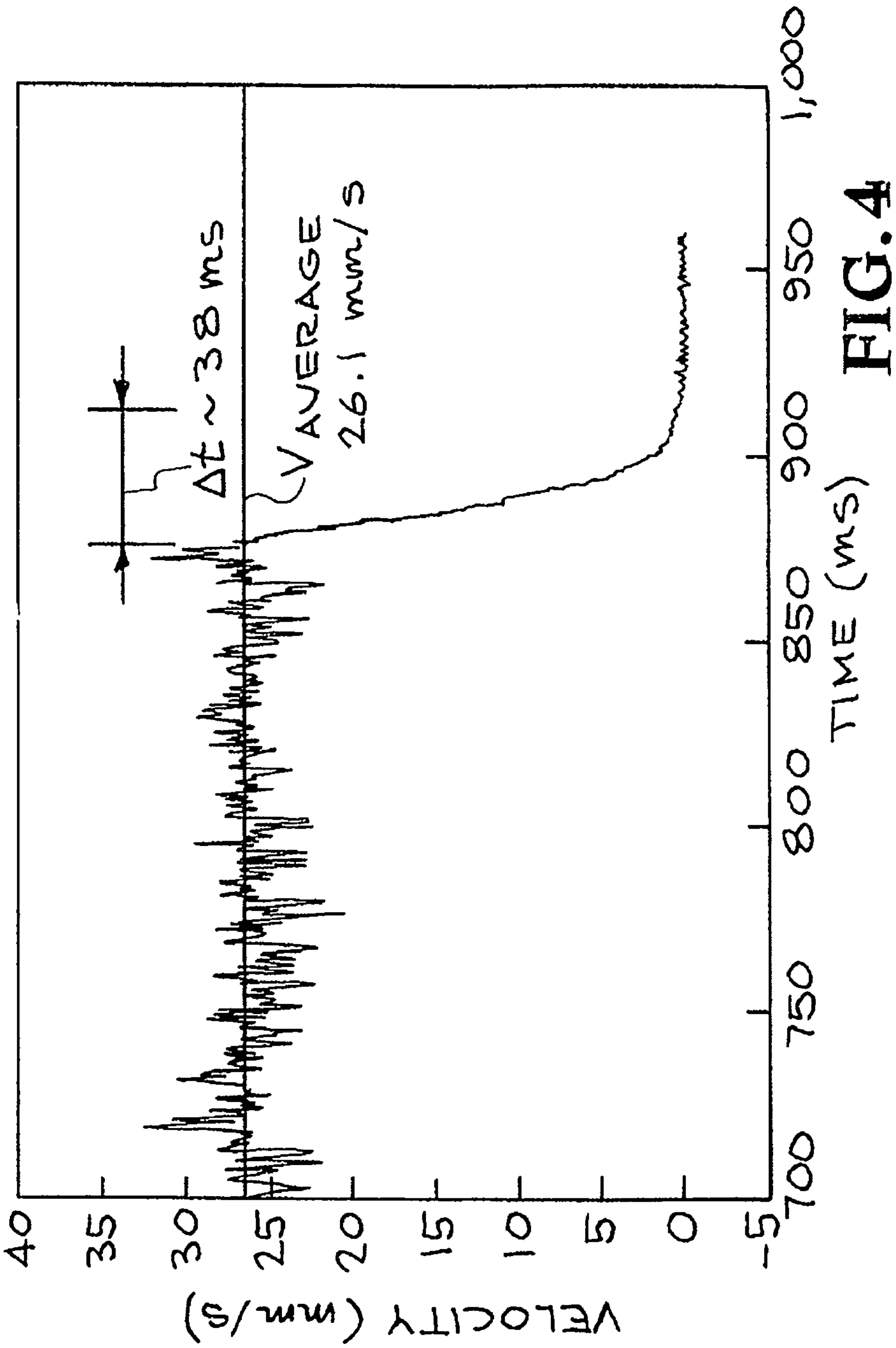
FIG. 4 is a graph illustrating droplet velocity profile verses time during droplet stopping.

Referring now to FIG. 4 a graph illustrates droplet velocity profile verses time during droplet stopping. Initial oil emulsifier flow rate is 10 μL/min, aqueous flow rate is 0.3 μL/min. Average droplet velocity prior to stopping is 26.1 mm/sec. Note the ~38 ms stopping time, defined as the time taken for the velocity to fall from 26.1 mm/sec to 0.3% of that value. A considerable contribution to the noise prior to droplet stopping is due to droplet production. Noise due to image analysis is evident after ~900 ms when the droplets are stopped and is primarily from an ~285 Hz arc lamp light source intensity fluctuation.

Figure 5:
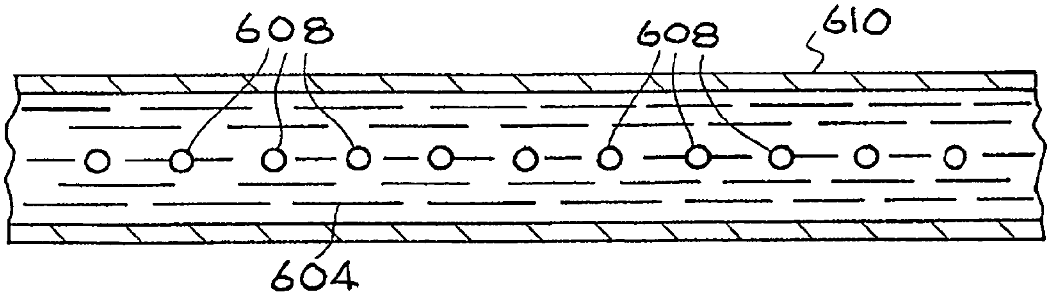
FIG. 5 illustrates an example of 11 stopped droplets containing MS2 bacteriophage that were subjected to RT-PCR real-time amplification and detection.

Referring now to FIG. 5 an example of 11 stopped droplets containing MS2 bacteriophage that were subjected to subsequent on-chip RT-PCR real-time amplification and detection is illustrated. Droplets 608 are illustrated in a microfluidic channel 610 carried by an emulsion fluid 604. Note the constant droplet separation and droplet monodispersity even after the rigorous thermal cycling regimen. Droplet size is ~32 μm (17 pL). Coalescence is notably absent even though no surfactants were employed. Droplets remain at channel center due to the hydrophobic surface coatings at the channel walls. Channel cross section is elliptical, 150 μm wide by 60 μm deep. In some embodiments of the present invention surfactants are added.

Figure 6:
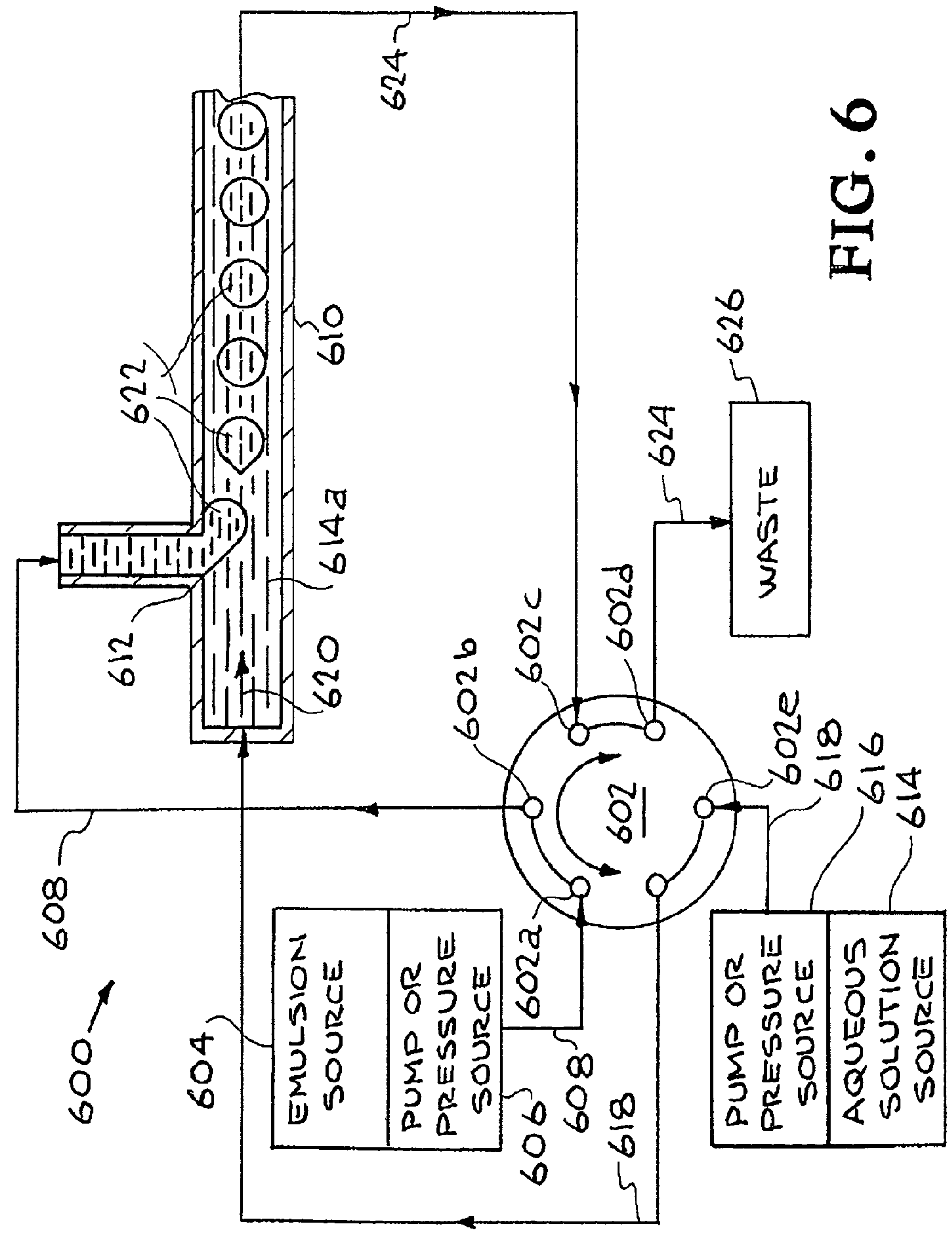
FIG. 6 illustrates forming an emulsion using two different fluids.

Referring now to FIG. 6 a system for droplet stopping with a T-junction generator is illustrated. The system is designated generally by the reference numeral 600. The system 600 illustrates forming an emulsion using two different fluids. An emulsion is a mixture of two immiscible liquids. One liquid (the dispersed phase) is dispersed in the other (the continuous phase). A commonly used emulsion is an oil/water emulsion.

In the system 600 the emulsion fluid used to form the droplets contains the sample and the aqueous solution functions as the carrier fluid. The system 600 includes the following structural elements: multiport valve 602, ports 602*a*-602*f*, emulsion fluid source 604, emulsion fluid 604*a*, pump or pressure source 606, line 608 (Emulsion Fluid), microfluidic channel 610, T-junction 612, aqueous solution source 614, aqueous solution 614*a*, pump or pressure source 616, line (Aqueous) 618, directional arrow 620, droplets 622, return line 624, and waste container 626.

In operation a fluid with the desired chemical reagents that may or may not include magnetic nanoparticles and contains the sample to be analyzed or acted upon is injected into the cross-channel flow of aqueous carrier fluid (T-junction shearing) as illustrated in FIG. 6. Pump 606 delivers emulsion fluid from an emulsion fluid source 604 through line 608 to port 602*a* on multiport valve 602. Emulsion fluid 604 exits valve 602 at port 602*b* and flows through the line 608 to produce droplets 622.

Pump 616 delivers aqueous solution 614*a* from aqueous solution source 614 through line 618 to valve 602 at port 602*e*. The aqueous solution 614*a* exits valve 602 at port 602*f* and flows into the flow channel 610. The aqueous solution flowing in microfluidic channel 610 in the direction shown by arrow 620 interacts with the emulsion fluid at T-Junction 612 and droplets 622 are formed by a shearing action. The droplets 622 do not mix with aqueous solution 614*a* and remain suspended in the aqueous solution 614*a* as discrete droplets. By repositioning valve 602 all ports can be shut effectively stopping all motion in microfluidic channel 610. This essentially freezes droplets 622 in some pre-determined position in order to perform some task on the droplets 622. Upon completion of the process on the droplets 622 the valve 602 can be repositioned and the droplets 622 can flow along return line 622 and pass thru ports 602*c* & 602*d* on valve 602 and on to waste container 626.

The system 600 provides apparatus and methods for generating a monodisperse stream of microdroplets 622 and subsequently stopping the stream of microdroplets 622 without droplet coalescence for as long as the droplets need to be stopped to allow chemical reaction, energy deposition, and optical interrogation to occur, such as in the on-chip Polymerase Chain Reaction process. The flow may then be restarted, seconds, minutes, hours, or days later to continue the experiment, sort or archive microdroplets, refresh the microfluidic channels, etc. The system 600 enables much longer photon acquisition times for single molecule/low light detection, it allows for non-instantaneous chemical reactions (the majority), and it allows for sorting and archival at a pace that matches data acquisition and control system capability. The microdroplets in the micro-nano-pico or femtoliter range can be chemically reacted, heated, cooled, optically interrogated, sorted and analyzed for as long as desired before channel flow is restarted. This greatly expands the use of microdroplet chemical and optical analysis is microfluidics because reactions will no longer have to take place within the millisecond time frames that moving droplets are in view of a device's optical window.

Figure 7:
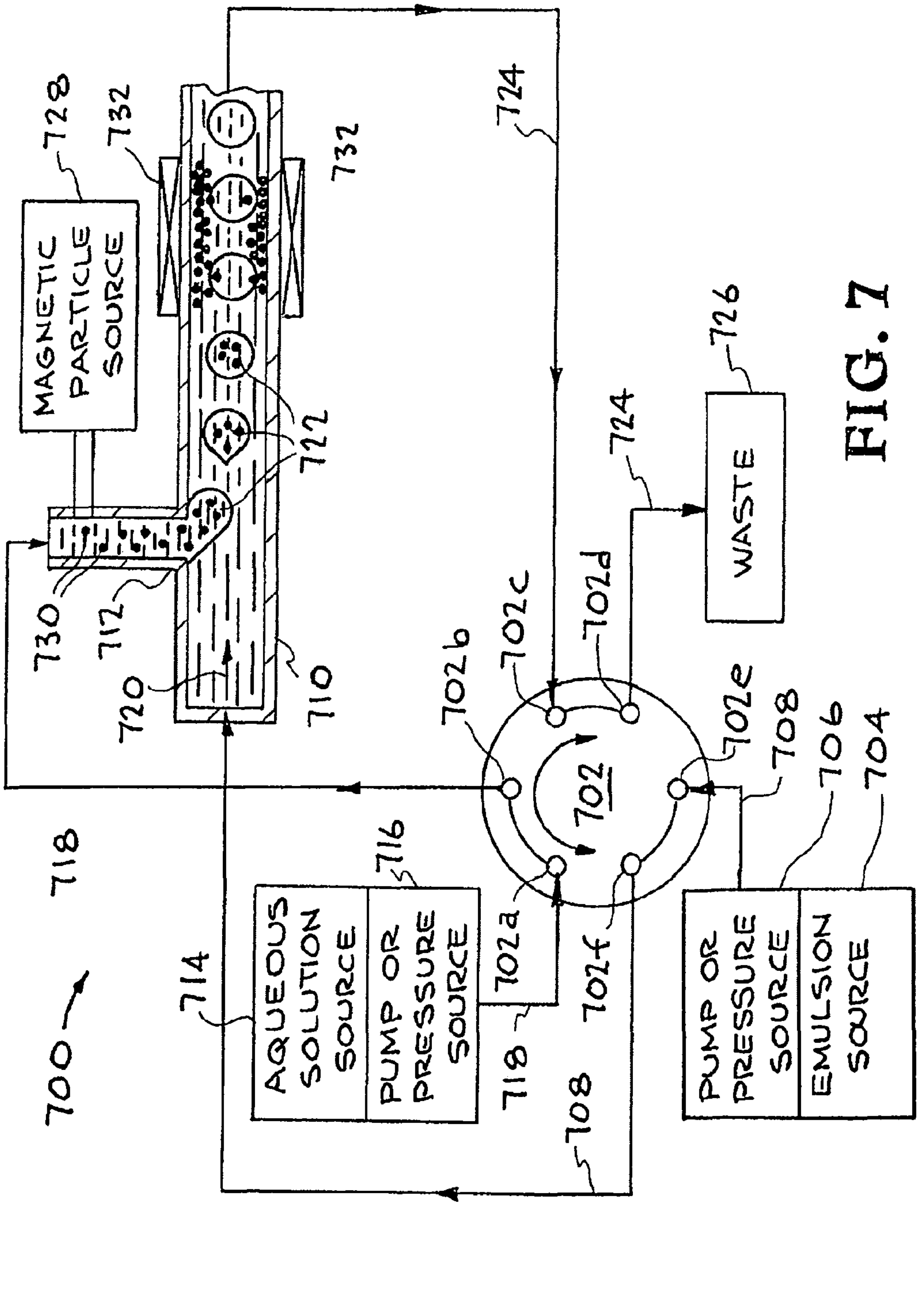
FIG. 7 illustrates a system for droplet stopping with mirodroplets containing magnetic beads.

Referring now to FIG. 7 a system for droplet stopping with a T-junction generator is illustrated. The system is designated generally by the reference numeral 700. The system 700 is similar to the system show in FIG. 2A. The system 700 additionally incorporates a source of nano-magnetic beads to which the sample to be analyzed will adhere and be contained in the droplets formed at the T-junction. When the droplet stream is stopped the magnets can be activated and the beads will be pulled free of the droplets and retained by the magnets for further processing. The system 700 includes the following structural elements: multiport valve 702, ports 702*a*-702*f*, emulsion fluid source 704, emulsion fluid 704*a*, pump or pressure source 706, line 708 (Emulsion Fluid), microfluidic channel 710, T-junction 712, aqueous solution 714, pump or pressure source 716, line (Aqueous) 718, directional arrow 720, droplets 722, return line 724, waste container 726, magnetic particle source 728, magnetic particles 730, and electro magnets 732.

In operation an aqueous fluid with the desired chemical reagents that may or may not include magnetic nanoparticles is injected into the cross-channel flow of carrier fluid (T-junction shearing) as illustrated in FIG. 7. Pump 706 delivers emulsion fluid 704 through line 708 to port 702*e* on multiport valve 702. Emulsion fluid 704 exits valve 702 at port 702*f* and flows through line 708 and enters microfluidic channel 710.

Pump 716 delivers aqueous solution 714 through line 718 to valve 702 at port 702*a*. The aqueous solution 714 exits valve 702 at port 702*b* and flows thru line 718 to T-Junction 712. The emulsion fluid 704 flowing in microfluidic channel 710 in the direction shown by arrow 720 interacts with aqueous solution 714 at T-Junction 712 and by a shearing action droplets 722 are formed. The aqueous solution droplets 722 formed of the aqueous solution 714 do not mix with emulsion fluid 704 and remain suspended as discrete droplets. By repositioning valve 702 all ports can be shut effectively stopping all motion in microfluidic channel 710. This essentially freezes droplets 722 in some pre-determined position in order to perform some task on the droplets 722. Upon completion of the process on the droplets 722 the valve 702 can be repositioned and the droplets 722 can flow along return line 722 and pass thru ports 702*c* & 702*d* on valve 702 and on to waste container 726.

The system 700 includes a source 728 of nano-magnetic beads 730 to which the sample to be analyzed will adhere and be contained in the droplets 722 formed at the T-junction 712. When the droplet stream is stopped the magnets 732 can be activated and the beads will be pulled free of the droplets and retained by the magnets for further processing.

The system 700 provides apparatus and methods for generating a monodisperse stream of microdroplets 722 and subsequently stopping the stream of microdroplets 722 without droplet coalescence for as long as the droplets need to be stopped to allow chemical reaction, energy deposition, and optical interrogation to occur, such as in the on-chip Polymerase Chain Reaction process. The flow may then be restarted, seconds, minutes, hours, or days later to continue the experiment, sort or archive microdroplets, refresh the microfluidic channels, etc. The system 700 enables much longer photon acquisition times for single molecule/low light detection, it allows for non-instantaneous chemical reactions (the majority), and it allows for sorting and archival at a pace that matches data acquisition and control system capability. The microdroplets in the micro-nano-pico or femtoliter range can be chemically reacted, heated, cooled, optically interrogated, sorted and analyzed for as long as desired before channel flow is restarted. This greatly expands the use of microdroplet chemical and optical analysis is microfluidics because reactions will no longer have to take place within the millisecond time frames that moving droplets are in view of a device's optical window.

Figure 8:
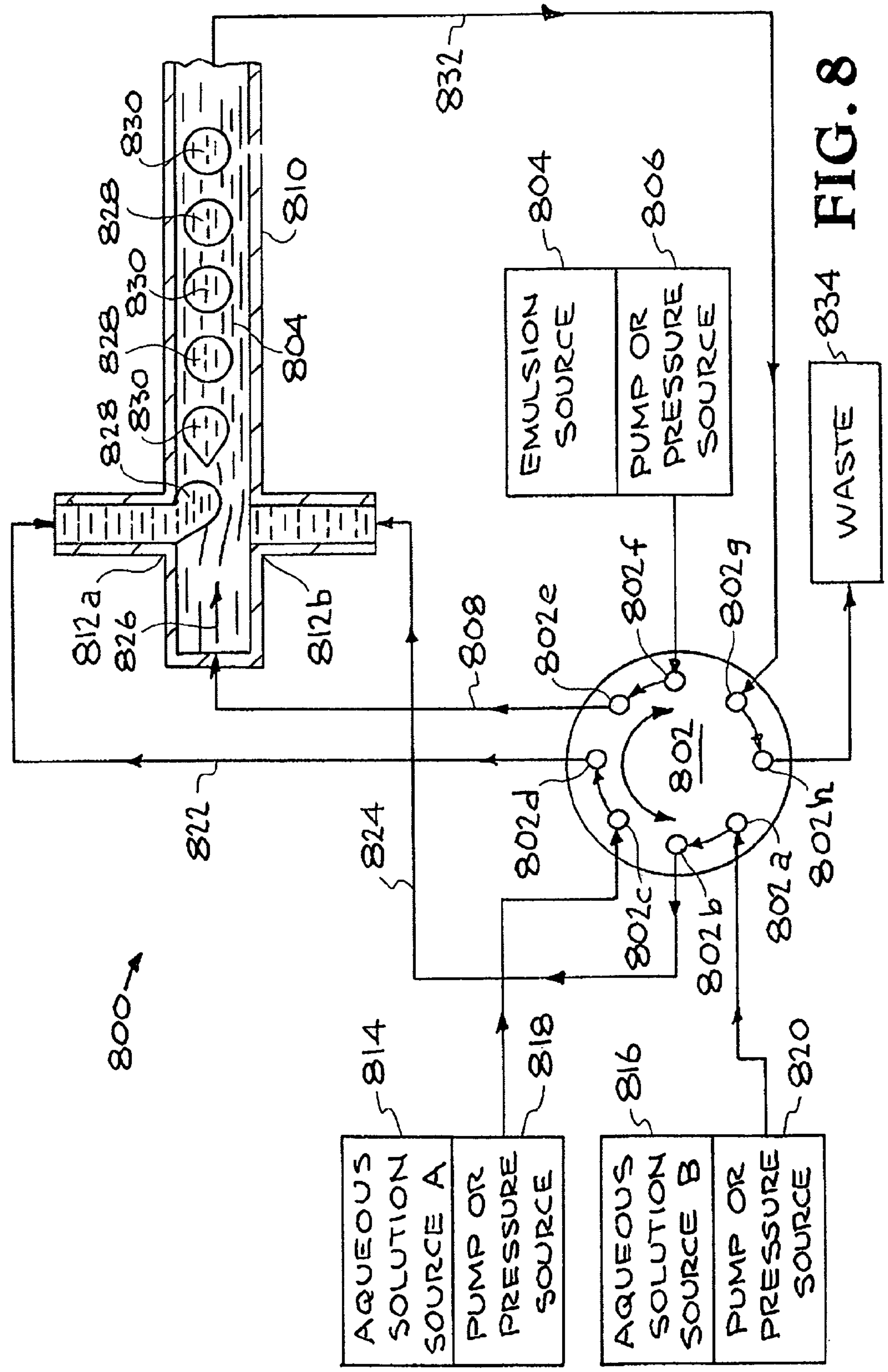
FIG. 8 a system for droplet stopping with a double T-junction generator for producing alternating droplets of solution A and solution B respectively.

Referring now to FIG. 8 a system for droplet stopping with a double T-junction generator for producing alternating droplets of solution A and solution B respectively is illustrated. The system is designated generally by the reference numeral 800. The system 800 includes the following structural elements: multiport valve 802, ports 802*a*-802*h*, emulsion fluid source 804, emulsion fluid 804*a*, pump or pressure source 806, line 808 (emulsion), microfluidic channel 810, T-junctions 812*a* and 812*b*, aqueous solution 814, aqueous solution 816, pump or pressure source 818, pump or pressure source 820, line (Aqueous Solution A) 822, directional arrow 826, droplet containing aqueous solution A 828, droplet containing aqueous solution B 830, return line 832, and waste container 834.

In operation an aqueous fluid (aqueous solution A reference numeral 828 and aqueous solution B reference numeral 830) with the desired chemical reagents that may or may not include magnetic nanoparticles is injected into the cross-channel flow of oil carrier fluid (Double T-junction Shearing at 812*a* and 812*b*) as illustrated in FIG. 8 producing alternate microdroplets 828 and 830. Pump 806 delivers emulsion fluid 804 through line 808 to port 802*f* on multiport valve 802. Emulsion fluid 804 exits valve 802 at port 802*e* and flows through line 808 into microfluidic channel 810.

Pump 818 delivers an aqueous solution (Aqueous Solution A) 814 to valve 802 at port 802*c*. The aqueous solution A 814 exits valve 802 at port 802*d* and flows thru line 822 to T-Junction 812*a*. The emulsion fluid 804 flowing in microfluidic channel 810 in the direction shown by arrow 826 interacts with aqueous solution A 814 at T-Junction 812*a* and by a shearing action droplets 828 are formed. The aqueous solution droplets 828 formed of the aqueous solution A 814 do not mix with emulsion fluid 804 and remain suspended in the emulsion fluid 804 as discrete droplets of aqueous solution A 814.

Pump 820 delivers an aqueous solution (Aqueous Solution B) 816 to valve 802 at port 802*a*. The aqueous solution B 814 exits valve 802 at port 802*b* and flows thru line 824 to T-Junction 812*b*. The emulsion fluid 804 flowing in microfluidic channel 810 in the direction shown by arrow 826 interacts with aqueous solution B 816 at T-Junction 812*b* and by a shearing action droplets 830 are formed. The aqueous solution B droplets 830 formed of the aqueous solution B 814 do not mix with emulsion fluid 804 and remain suspended in the emulsion fluid 804 as discrete droplets of aqueous solution B 816.

By repositioning valve 802 all ports can be shut effectively stopping all motion in microfluidic channel 810. This essentially freezes droplets 828 and 830 in some pre-determined position in order to perform some task on the droplets 828 and/or 830. Upon completion of the process on the droplets 828 and 830 the valve 802 can be repositioned and the droplets 828 and 830 can flow along return line 822 and pass thru ports 802*g* & 802*h* on valve 802 and on to waste container 834.

The system 800 provides apparatus and methods for generating a monodisperse stream of microdroplets 828 and 830 and subsequently stopping the stream of microdroplets 828 and 830 without droplet coalescence for as long as the droplets need to be stopped to allow chemical reaction, energy deposition, and optical interrogation to occur, such as in the on-chip Polymerase Chain Reaction process. The flow may then be restarted, seconds, minutes, hours, or days later to continue the experiment, sort or archive microdroplets, refresh the microfluidic channels, etc. The system 800 enables much longer photon acquisition times for single molecule/low light detection, it allows for non-instantaneous chemical reactions (the majority), and it allows for sorting and archival at a pace that matches data acquisition and control system capability. The microdroplets in the micro-nano-pico or femtoliter range can be chemically reacted, heated, cooled, optically interrogated, sorted and analyzed for as long as desired before channel flow is restarted. This greatly expands the use of microdroplet chemical and optical analysis is microfluidics because reactions will no longer have to take place within the millisecond time frames that moving droplets are in view of a device's optical window.

Figure 9A:
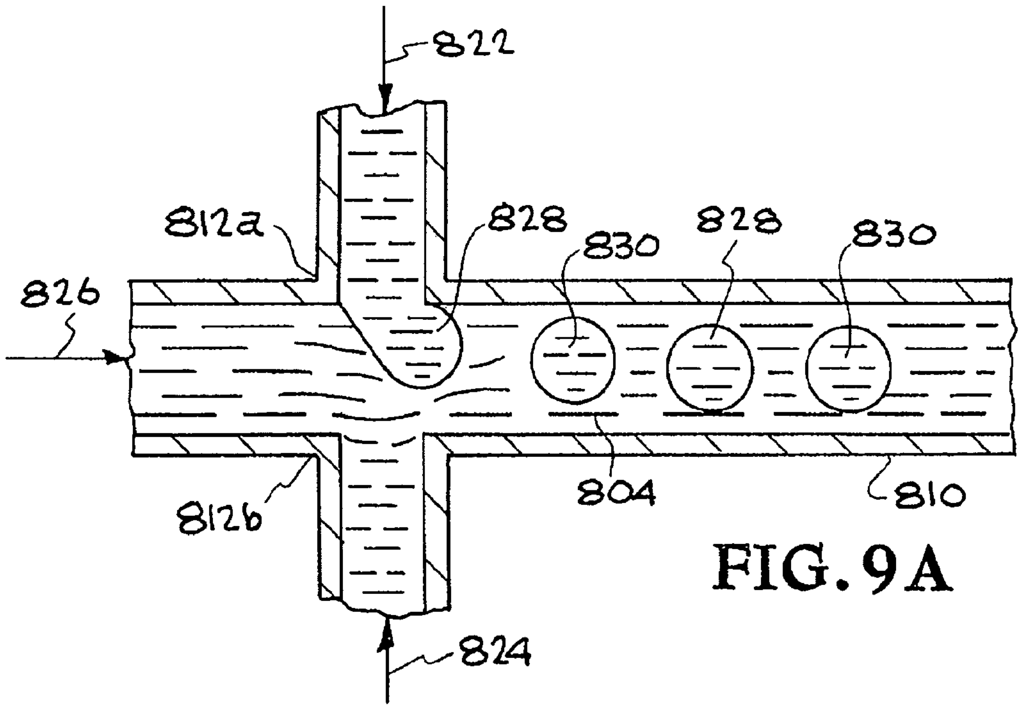
FIGS. 9A and 9B provide additional details of the system for droplet stopping with a double T-junction generator for producing alternating droplets of solution A and solution B respectively.
Figure 9B:
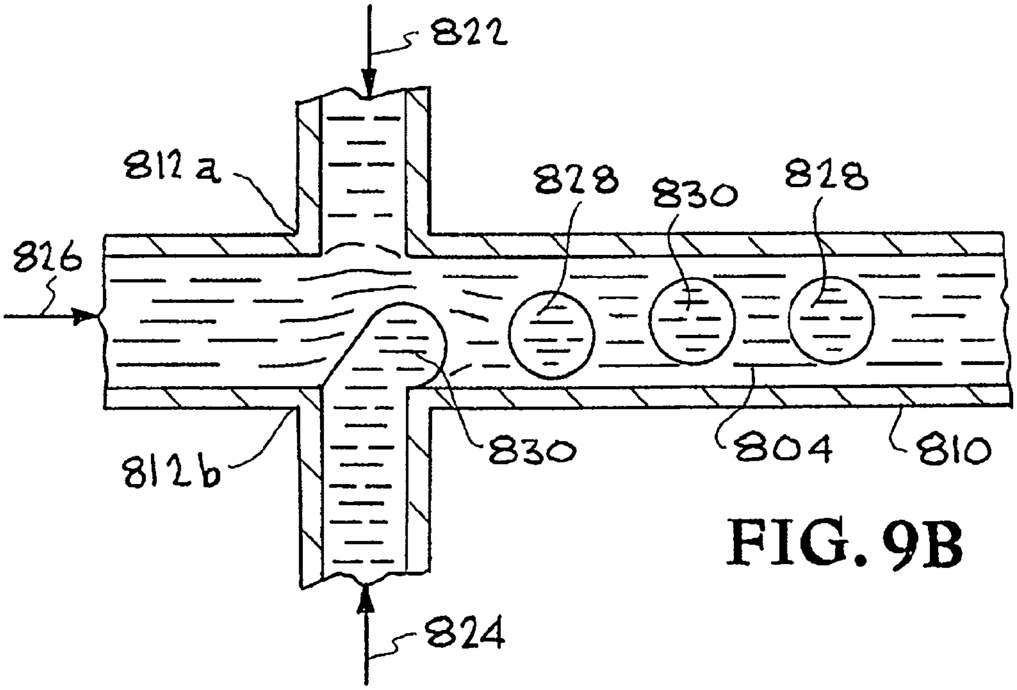

Referring now to FIGS. 9A and 9B additional detail of the system 800 for droplet stopping with a double T-junction generator for producing alternating droplets of solution A and solution B respectively are illustrated. In operation the aqueous fluid (aqueous solution A reference numeral 828 and aqueous solution B reference numeral 830) is injected into the flow channel 810 of oil carrier fluid 804 using the double T-junction shearing at 812*a* and 812*b* to produce alternate microdroplets 828 and 830. Microdroplets 828 contain solution A and microdroplets 830 contain solution B The aqueous solution A flows thru line 822 to T-Junction 812*a*. The emulsion fluid 804 flowing in microfluidic channel 810 in the direction shown by arrow 826 interacts with aqueous solution A from line 822 at T-Junction 812*a* and by a shearing action forms droplets 828. The aqueous solution droplets 828 formed of the aqueous solution A 814 do not mix with emulsion fluid 804 and remain suspended in the emulsion fluid 804 as discrete droplets of aqueous solution A.

The aqueous solution B flows thru line 824 to T-Junction 812*b*. The emulsion 804 flowing in microfluidic channel 810 in the direction shown by arrow 826 interacts with aqueous solution B from line 824 at T-Junction 812*b* and by a shearing action forms droplets 830. The aqueous solution droplets 830 formed of the aqueous solution B do not mix with emulsion fluid 804 and remain suspended in the emulsion fluid 804 as discrete droplets of aqueous solution B.

Figure 10:
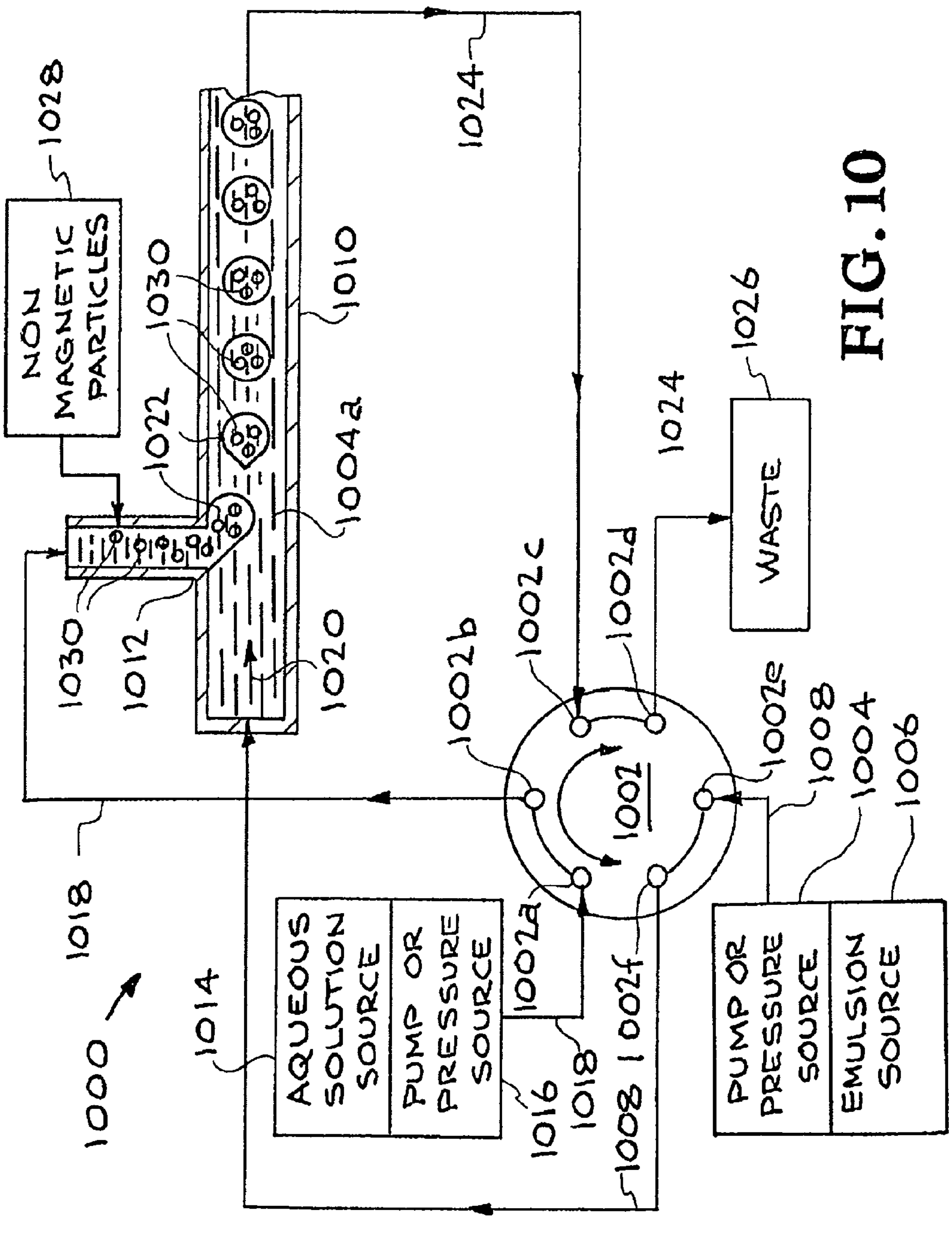
FIG. 10 illustrates a system for droplet stopping with mirodroplets containing non magnetic particles.

Referring now to FIG. 10 a system for droplet stopping with microdroplets with non magnetic particles is illustrated. The system is designated generally by the reference numeral 1000. The system 1000 is similar to the system show in FIG. 2A. The system 1000 additionally incorporates a source of non magnetic particles to which the sample to be analyzed will adhere and be contained in the droplets formed at the T-junction. The system 1000 includes the following structural elements: multiport valve 1002, ports 1002*a*-1002*f*, emulsion fluid source 1006, emulsion fluid 1004*a*, pump or pressure source 1004, line 1008 (Emulsion Fluid), microfluidic channel 1010, T-junction 1012, aqueous solution 1014, pump or pressure source 1016, line (Aqueous) 1018, directional arrow 1020, droplets 1022, return line 1024, waste container 1026, non magnetic particles source 1028, and non magnetic particles 1030.

In operation an aqueous fluid 1014 that includes non magnetic nanoparticles 1030 is injected into the cross-channel flow of emulsion 1004*a* and subjected to T-junction shearing at 1012 as illustrated in FIG. 10. Pump 1004 delivers emulsion fluid 1004*a* through line 1008 to port 1002*e* on multiport valve 1002. Emulsion fluid 1004*a* exits valve 1002 at port 1002*f* and flows through line 1008 and enters microfluidic channel 1010.

Pump 1016 delivers aqueous solution 1014 through line 1018 to valve 1002 at port 1002*a*. The aqueous solution 1014 exits valve 1002 at port 1002*b* and flows thru line 1018 to T-Junction 1012. The emulsion fluid 1004*a* flowing in microfluidic channel 1010 in the direction shown by arrow 1020 interacts with aqueous solution 1014*a* at T-Junction 1012 and by a shearing action droplets 1022 are formed. The system 1000 includes a source of non magnetic particles 1028 to which the sample to be analyzed will adhere and be contained in the droplets 1022 formed at the T-junction 1012.

The aqueous solution droplets 1022 containing the non magnetic particles 1030 formed of the aqueous solution 1014*a* do not mix with emulsion fluid 1004*a* and remain suspended in the emulsion fluid 1004*a* as discrete droplets. By repositioning valve 1002 all ports can be shut effectively stopping all motion in microfluidic channel 1010. This essentially freezes droplets 1022 in some pre-determined position in order to perform some task on the droplets 1022. Upon completion of the process on the droplets 1022 the valve 1002 can be repositioned and the droplets 1022 can flow along return line 1022 and pass thru ports 1002*c* & 1002*d* on valve 1002 and on to waste container 1026.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. An apparatus for monodispersed microdroplet generation and trapping of a sample wherein the sample is in an aqueous solution, comprising:

a microchip;

a microfluidic flow channel in said microchip;

a source of the sample in an aqueous solution, a source fluid and magnetic particles wherein the sample adheres to said magnetic particles, said source connected to said microfluidic flow channel, said source including a pressure source;

a droplet maker that generates microdroplets containing the sample in an aqueous solution, said source fluid and said magnetic particles, said droplet maker connected to said microfluidic flow channel and connected to said source of the sample, said source fluid and said magnetic particles, wherein said droplet maker includes a T-junction connected to said microfluidic flow channel and connected to said source of the sample, said source fluid and said magnetic particles producing microdroplets containing the sample, said source fluid and said magnetic particles;

a carrier fluid in said microfluidic flow channel, said carrier fluid introduced to said microfluidic flow channel by a source of carrier fluid, said source of carrier fluid including a pressure source;

a trapping section in said microfluidic flow channel, said trapping section including magnets; and a valve system including a multiport valve, said multiport valve directly connected to said microfluidic flow channel and said multiport valve directly connected to said T-junction, and said multiport valve directly connected to said source of the sample in an aqueous solution, a source fluid and magnetic particles and said multiport valve directly connected to said carrier fluid, wherein said valve system controls flow of said carrier fluid and said microdroplets containing the sample, said source fluid and said magnetic particles that enables trapping of said microdroplets containing the sample, said source fluid and said magnetic particles in said trapping section.

2. The apparatus for monodispersed microdroplet generation and trapping of claim 1, wherein said source fluid is water and wherein said carrier fluid is oil and wherein said source of the sample in an aqueous solution and said water source fluid and magnetic particles do not mix with said oil carrier fluid.

3. An apparatus for monodispersed microdroplet generation and trapping of a sample wherein the sample is in an aqueous solution, comprising:

a microchip;

a microfluidic flow channel in said microchip;

a source of the sample in an aqueous solution, a source fluid and non magnetic particles wherein the sample adheres to said non magnetic particles, said source connected to said microfluidic flow channel, said source including a pump;

a droplet maker that generates microdroplets containing the sample in an aqueous solution, said source fluid and said non magnetic particles, said droplet maker connected to said microfluidic flow channel and connected to said source of the sample, said source fluid and said non magnetic particles, wherein said droplet maker includes a T-junction connected to said microfluidic flow channel and connected to said source of the sample, said source fluid and said non magnetic particles producing microdroplets containing the sample, said source fluid and said non magnetic particles;

a carrier fluid in said microfluidic flow channel, said carrier fluid introduced to said microfluidic flow channel by a source of carrier fluid wherein said source of carrier fluid is a source of water carrier fluid and wherein said source fluid is oil, wherein said carrier fluid in said flow channel is water producing microdroplets of oil source fluid, the sample, and said non magnetic particles in water carrier fluid in said microfluidic flow channel, said source of carrier fluid including a pump;

a trapping section in said microfluidic flow channel, said trapping section comprising a portion of said microfluidic flow channel wherein said non magnetic particles and said microdroplets are trapped; and a valve system including a multiport valve, said multiport valve directly connected to said microfluidic flow channel and said multiport valve directly connected to said T-junction, and said multiport valve directly connected to said source of the sample in an aqueous solution, a source fluid and non magnetic particles and said multiport valve directly connected to said carrier fluid, wherein said valve system controls flow of said carrier fluid to stop said non magnetic particles and said microdroplets in said trapping section and enables trapping of said microdroplets and said non magnetic particles in said trapping section.

* * * * *